(12) United States Patent (10) Patent No.: US 12,631,874 B2
Kawai (45) Date of Patent: May 19, 2026

(54) HEAD-UP DISPLAY DEVICE AND VEHICLE

(71) Applicant: Nippon Seiki Co., Ltd., Niigata (JP)

(72) Inventor: Takeru Kawai, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 291 days.

(21) Appl. No.: 18/393,384

(22) Filed: Dec. 21, 2023

(65) Prior Publication Data

US 2024/0210681 A1 Jun. 27, 2024

(30) Foreign Application Priority Data

Dec. 23, 2022 (JP) ................................. 2022-206277

(51) Int. Cl.
   *G02B 27/01* (2006.01)
   *G02B 17/06* (2006.01)
(52) U.S. Cl.
   CPC ......... *G02B 27/0101* (2013.01); *G02B 17/06* (2013.01)
(58) Field of Classification Search
   CPC ..... G02B 27/0101; G02B 27/01; G02B 17/06
   USPC ......................................................... 359/630
   See application file for complete search history.

(56) References Cited

U.S. PATENT DOCUMENTS

2019/0271840 A1* 9/2019 Kishigami ........... B60K 35/233
2019/0302583 A1* 10/2019 Taniguchi .......... G02B 27/0179

2020/0026075 A1* 1/2020 Kim ..................... G02B 27/286
2020/0150433 A1* 5/2020 Satoh ................. G02B 27/0101
2020/0174253 A1* 6/2020 Nambara ............... G02B 5/045
2020/0183161 A1* 6/2020 Choi ...................... G06T 19/006
2021/0041707 A1* 2/2021 Misawa ............. G02B 27/0101
2021/0131818 A1* 5/2021 Yamaguchi ........ G02B 27/0101
2021/0291658 A1* 9/2021 Hirata ..................... B60K 35/23

FOREIGN PATENT DOCUMENTS

WO 2015/093294 A1 6/2015

* cited by examiner

*Primary Examiner* — William R Alexander
(74) *Attorney, Agent, or Firm* — Rimon P.C.

(57) ABSTRACT

A head-up display device includes: a light emission surface that displays an image and emits display light corresponding to the displayed image; and a concave mirror that reflects the display light toward the windshield, and has an index S, represented in expression $S=10.7\times Mh+(-8.32)\times Mv+(-0.0187)\times Wh+(-0.000995)\times Wv+0.345\times Wi+(-3.52)\times Ci+3.90\times Dv$, which is set to 90 or greater, where Mh and Mv respectively are magnifications in the horizontal and vertical directions of the virtual image with respect to the image in the optical axis position, Wh and Wv respectively are curvature radiuses in the horizontal and vertical direction of the position in which the optical axis reaches in the windshield, Wi is an incident angle of the optical axis into the windshield, Ci is an incident angle of the optical axis into the concave mirror, and Dv is an angle formed between a normal line of the light emission surface and the optical axis of the display light.

4 Claims, 4 Drawing Sheets

FIG. 2

| COEFFICIENT A | COEFFICIENT B | COEFFICIENT C | COEFFICIENT D | COEFFICIENT E | COEFFICIENT F | COEFFICIENT G |
|---|---|---|---|---|---|---|
| 10.652 | -8.324 | -0.018700 | -0.000995 | 0.345 | -3.521 | 3.902 |

| MODEL No. | Magnification | | WS | | CVM | Display |
|---|---|---|---|---|---|---|
| | Mh | Mv | Wh(mm) | Wv(mm) | Wi(°) | Ci(°) | Dv(°) |
| 1 | 14.7 | 14.0 | 3218 | 8322 | 59.2 | 27.2 | 44 |
| 2 | 12.9 | 12.2 | 3428 | 8754 | 64.9 | 25.9 | 46 |
| 3 | 14.6 | 14.0 | 3219 | 8324 | 59.2 | 27.2 | 46 |
| 4 | 15.5 | 14.5 | 3480 | 9172 | 62.6 | 22.3 | 42 |
| 5 | 14.4 | 14.5 | 2577 | 12111 | 61.4 | 25.6 | 44 |
| 6 | 14.3 | 14.5 | 3218 | 8324 | 61.6 | 25.7 | 44 |
| 7 | 14.6 | 14.2 | 2706 | 9777 | 62.5 | 24.2 | 44 |
| 8 | 15.6 | 14.2 | 3787 | 8025 | 63.3 | 22.3 | 44 |
| 9 | 16.7 | 12.6 | 3798 | 4618 | 64.9 | 21.5 | 40 |
| 10 | 14.1 | 13.5 | 2192 | 6653 | 60.3 | 26.5 | 46 |
| 11 | 14.4 | 14.3 | 2563 | 10138 | 61.5 | 22.3 | 46 |
| 12 | 14.7 | 13.6 | 2439 | 6693 | 62.7 | 24.5 | 44 |
| 13 | 15.6 | 14.9 | 2192 | 6653 | 60.3 | 26.5 | 46 |
| 14 | 15.4 | 12.1 | 3480 | 9172 | 62.6 | 22.3 | 42 |
| 15 | 16.2 | 16.0 | 2563 | 10138 | 61.5 | 22.3 | 46 |
| 16 | 14.7 | 13.6 | 2439 | 6693 | 62.7 | 24.5 | 45 |
| 17 | 16.7 | 12.6 | 3798 | 4618 | 64.9 | 21.5 | 43 |

FIG. 3

| MODEL No. | VID | | | Depth (m) | TILT ANGLE θ(°) | INDEX S | TARGET INDEX T | ERROR Δ | SQUARE OF Δ |
| | VID1 (m) | VID2 (m) | VID3 (m) | | | | | | |
|---|---|---|---|---|---|---|---|---|---|
| 1 | 4.29 | 5.33 | 6.83 | 2.54 | 83.47 | 67 | 64 | 3 | 9.060495 |
| 2 | 4.26 | 5.33 | 7.00 | 2.74 | 83.86 | 74 | 69 | 5 | 20.44893 |
| 3 | 4.20 | 5.33 | 7.07 | 2.87 | 84.13 | 75 | 73 | 2 | 3.446685 |
| 4 | 4.20 | 5.33 | 7.11 | 2.91 | 84.18 | 77 | 74 | 3 | 8.774529 |
| 5 | 4.16 | 5.33 | 7.16 | 3.00 | 84.37 | 75 | 76 | -1 | 0.60934 |
| 6 | 4.14 | 5.33 | 7.22 | 3.08 | 84.48 | 66 | 78 | -12 | 150.7845 |
| 7 | 4.10 | 5.34 | 7.30 | 3.20 | 84.70 | 85 | 81 | 4 | 15.32861 |
| 8 | 4.12 | 5.33 | 7.41 | 3.29 | 84.77 | 84 | 83 | 1 | 1.216477 |
| 9 | 4.10 | 5.33 | 7.82 | 3.72 | 85.20 | 100 | 94 | 6 | 39.45506 |
| 10 | 4.01 | 5.33 | 7.84 | 3.83 | 85.38 | 98 | 97 | 1 | 0.382447 |
| 11 | 3.98 | 5.33 | 7.86 | 3.88 | 85.44 | 99 | 98 | 1 | 0.74565 |
| 12 | 4.01 | 5.33 | 7.92 | 3.91 | 85.44 | 98 | 99 | -1 | 1.661235 |
| 13 | 3.97 | 5.33 | 7.92 | 3.95 | 85.51 | 102 | 100 | 2 | 2.637551 |
| 14 | 4.01 | 5.38 | 8.05 | 4.04 | 85.42 | 96 | 102 | -6 | 37.71444 |
| 15 | 3.92 | 5.33 | 7.97 | 4.05 | 85.61 | 103 | 103 | 1 | 0.818925 |
| 16 | 3.97 | 5.33 | 8.10 | 4.13 | 85.63 | 102 | 105 | -3 | 8.740694 |
| 17 | 3.95 | 5.33 | 8.55 | 4.60 | 85.94 | 112 | 116 | -4 | 18.41291 |
| | | | | | | | MINIMUM SUM OF SQUARES | | 320.2385 |

HEAD-UP DISPLAY DEVICE AND VEHICLE

TECHNICAL FIELD

The present disclosure relates to a head-up display device and a vehicle.

BACKGROUND ART

A head-up display device described in Patent Document 1 displays a tilted virtual image by tilting a display surface of a liquid-crystal display with respect to an emission surface of a light-source unit at a predetermined tilt angle.

PRIOR ART DOCUMENT

Patent Document

Patent Document 1: WO 2015/093294

SUMMARY OF INVENTION

Technical Problem

In reality, parameters other than the tilt angle also affect adjustment of a tilt angle of a virtual image. It has been unclear which parameter affects the tilt angle and how. Therefore, it has been difficult to display a virtual image at a desired tilt angle.

The present disclosure has been made in consideration of the above-stated circumstances. An objective of the present disclosure is to provide a head-up display device and a vehicle, which can display a virtual image at a desired tilt angle.

Solution to Problem

So as to achieve the above-stated objective, the head-up display device according to the first aspect of the present disclosure is a head-up display device displaying a virtual image by emitting display light toward a windshield, the head-up display device including: a light emission surface that displays an image and emits display light which corresponds to the displayed image; and a concave mirror that reflects the display light toward the windshield, in which an index S represented in expression 1 is set to 90 or greater, where the expression 1 is $S=10.7 \times Mh+(-8.32) \times Mv+(-0.0187) \times Wh+(-0.000995) \times Wv+0.345 \times Wi+(-3.52) \times Ci+3.90 \times Dv$, in which Mh: Magnification in the horizontal direction of the virtual image with respect to the image in the optical axis position of the display light [–]; Mv: Magnification in the vertical direction of the virtual image with respect to the image in the optical axis position of the display light [–]; Wh: Curvature radius in the horizontal direction of the position in which the optical axis of the display light reaches in the windshield [mm]; Wv: Curvature radius in the vertical direction of the position in which the optical axis of the display light reaches in the windshield [mm]; Wi: Incident angle of the optical axis of the display light L into the windshield [deg]; Ci: Incident angle of the optical axis of the display light L into the concave mirror [deg]; and Dv: Angle formed between the normal line of the light emission surface as viewed from the horizontal direction and the optical axis of the display light emitted from the light emission surface [deg]. So as to achieve the above-stated objective, the vehicle according to the second aspect of the present disclosure is a vehicle on which the above-described head-up display device is mounted, in which the head-up display device displays the virtual image at an angle parallel to a road surface on which the vehicle travels.

Advantageous Effects of Invention

The present disclosure can display a virtual image at a desired tilt angle.

BRIEF DESCRIPTION OF DRAWINGS

FIG. 2 is a table illustrating parameter values and coefficients for each model.

FIG. 3 is a table illustrating indices, tilt angles, and the like, for each model.

DESCRIPTION OF EMBODIMENTS

The following describes a head-up display device and a vehicle according to an embodiment of the present disclosure, with reference to the drawings.

Figure 1:
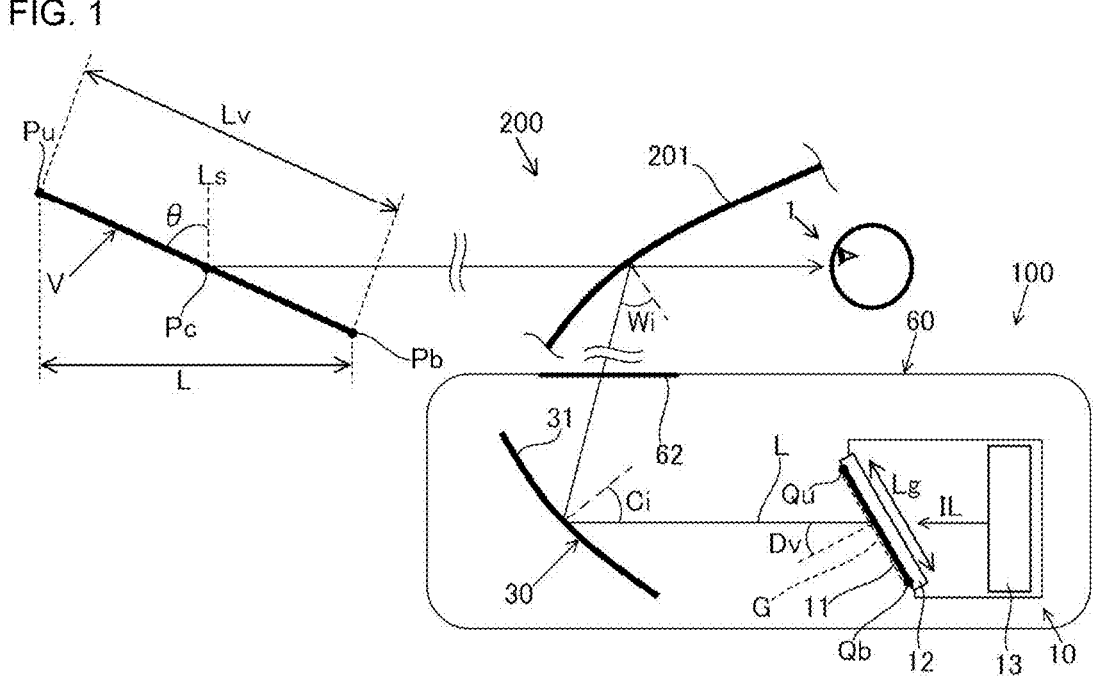
FIG. 1 is a schematic diagram illustrating a head-up display device according to an embodiment of the present disclosure.

As illustrated in FIG. 1, a head-up display device 100 is installed in a dashboard of a vehicle 200. The head-up display device 100 emits display light L representing an image, toward a windshield 201 of the vehicle 200. The windshield 201 is made of a translucent material such as laminated glass, and is formed into a curved plate form, which is curved into the vehicle width direction (horizontal direction) and a height direction (vertical direction) in mutually different curvatures. The display light L is reflected at the windshield 201 and reaches a viewer 1 (mainly a driver of the vehicle 200). Accordingly, the virtual image V is displayed so as to be visible by the viewer 1.

The head-up display device 100 includes a display unit 10, a concave mirror 30, and a housing 60.

The housing 60 is made of non-translucent resin or metal, and forms an approximately rectangular solid which is hollow.

The housing 60 has an opening at a position opposing the windshield 201. The housing 60 includes a window 62 to close the opening 61. The window 62 is made of translucent resin, such as acrylic, through which the display light L transmits. The display unit 10 and the concave mirror 30 are housed in the housing 60.

The display unit 10 includes a display 12 and an illuminating device 13 that illuminates the display 12. The illuminating device 13 includes a plurality of light emitting diodes (LED) that emit illumination light IL. The display 12 is a thin film transistor (TFT) liquid crystal display panel, and is formed into a rectangular plate form. The display 12 receives the illumination light IL from the illuminating device 13 and emits the display light L from a light emission surface 11. An image G corresponding to a virtual image V is displayed on the light emission surface 11. The image G is formed by reducing the vertical and horizontal sizes of the virtual image V and performing distortion correction thereon. The light emission surface 11 is provided in a direction not orthogonal to the illumination light IL. In this example, the light emission surface 11 is provided so that the upper end Qu of the light emission surface 11 is closer to a reflection surface 31 of the concave mirror 30 than the lower end Qb of the light emission surface 11 is. Not limited to this, the display unit 10 may have a configuration that includes a micro electro mechanical system (MEMS), digital micromirror device (DMD), or an organic electro-luminescence (organic EL) panel.

The concave mirror 30 includes a reflection surface 31 that enlarges and reflects the display light L from the display unit 10 towards the windshield 201. The reflection surface 31 is formed to be curved in a concave form as viewed from the vehicle width direction.

The virtual image V displayed by the head-up display device 100 is tilted at a tilt angle θ. The tilt angle θ is defined to be an angle formed by a line segment extending from a center position Pc towards an upper end Pu of a virtual image V (to be more exact, a displayable area of the virtual image V), with respect to a reference line Ls. The reference line Ls is a line that extends in a direction orthogonal to a traveling direction of the display light L reflected at the windshield 201, and that extends upward from, as a starting point, the center position Pc of the virtual image V. The virtual image V is tilted so that the lower end Pb of the virtual image V is closer to the viewer 1 and the upper end Pu of the virtual image V is farther from the viewer 1. The lower end Pb of the virtual image V optically corresponds to the upper end Qu of the light emission surface 11, and the upper end Pu of the virtual image V optically corresponds to the lower end Qb of the light emission surface 11. The vertical field angle of the virtual image V is 3 degrees. The vertical field angle is formed between a line segment connecting the viewpoint of the viewer 1 and the upper end Pu of the virtual image V and a line segment connecting the viewpoint of the viewer 1 and the lower end Pb of the virtual image V. A depth L of the virtual image V is defined to be a distance between the upper end Pu and the lower end Pb, along the traveling direction of the display light L reflected at the windshield 201.

The main principle behind tilting of the virtual image V is that the optical path length of the display light L differs depending on the position of the light emission surface 1 in the surface direction of the light emission surface 11, and accordingly, the magnification differs due to this difference. For example, an optical path length from, as a starting point, the lower end Qb of the light emission surface 11 is longer than an optical path length from, as a starting point, the upper end Qu of the light emission surface 11. Therefore, the upper end Pu of the virtual image V corresponding to the lower end Qb is displayed farther from the viewer 1 than the lower end Pb of the virtual image V corresponding to the upper end Qu is, and the magnification of the image is higher.

The inventors of the present invention conceived that, as a factor that generates a difference in optical path length (i.e., difference in magnification), adjusting of the following parameters (Mh, Mv, Wh, Wv, Wi, Ci, Dv) is necessary.

Mh: Magnification in the horizontal direction of the virtual image V with respect to the image G in the optical axis position of the display light L [−]

Mv: Magnification in the vertical direction of the virtual image V with respect to the image G in the optical axis position of the display light L [−]

Wh: Curvature radius in the horizontal direction of the position in which the optical axis of the display light L reaches in the windshield 201 [mm]

Wv: Curvature radius in the vertical direction of the position in which the optical axis of the display light L reaches in the windshield 201 [mm]

Wi: Incident angle of the optical axis of the display light L into the windshield 201 [deg]

Ci: Incident angle of the optical axis of the display light L into the concave mirror 30 [deg]

Dv: Angle formed between the normal line of the light emission surface 11 as viewed from the horizontal direction and the optical axis of the display light L emitted from the light emission surface 11 [deg]

As described above, the magnification of the virtual image V with respect to the image G differs depending on the positions of the image G and the virtual image V in the surface direction. Therefore, the magnifications Mh and Mv are obtained with reference to the magnifications of the center positions (optical axis positions) of the image G and the virtual image V. As the magnification Mv in the vertical direction (i.e., the direction along the height direction) gets higher, the image G represented on the light emission surface 11 is greatly enlarged in the vertical direction and is displayed as the virtual image V. As the magnification Mh in the horizontal direction (i.e., the vehicle width direction) gets higher, the image G is greatly enlarged in the horizontal direction and is displayed as the virtual image V.

The curvature radius Wh in the horizontal direction represents a curvature in the horizontal direction of the windshield 201 at the reflection point at which the optical axis of the display light L is reflected. As the curve gets gentler, the curvature radius Wh gets greater. The curvature radius Wv in the vertical direction represents a curvature in the vertical direction of the windshield 201 at the reflection point at which the optical axis of the display light L is reflected. As the curve gets gentler, the curvature radius Wv gets greater. The optical axis of the display light L is a light ray which passes through the center of the cut section of the display light L which is vertical to the traveling direction of the display light L, and FIG. 1 only illustrates the optical axis linearly, as the display light L.

The incident angle Wi is an incident angle of the optical axis of the display light L from the concave mirror 30 when the display light L is reflected by the windshield 201 toward the viewer 1.

The incident angle Ci is an incident angle of the optical axis of the display light L from the light emission surface 11 when the display light L is reflected by the concave mirror 30 toward the windshield 201.

The angle Dv is an angle formed by two vectors on a projection surface, which are obtained by respectively projecting a spatial vector extending from the center position of the light emission surface 11 along the normal line of the light emission surface 11 and a spatial vector extending along the optical axis of the display light L emitted from the light emission surface 11, onto the projection surface along the vehicle front-back direction and the height direction. The angle Dv is the same as the tilt angle of the display 12 with respect to the light source board (not illustrated) of the illuminating device 13.

Then, the inventors of the present invention conceived that desired tilting, i.e., tilting of the virtual image V along a road surface, is obtained by an index S derived from the following expression 1 being 90 or greater (S≥90).

$$S = 10.7 \times Mh + (-8.32) \times Mv + (-0.0187) \times Wh + \qquad \text{(Expression 1)}$$

$$(-0.000995) \times Wv + 0.345 \times Wi + (-3.52) \times Ci + 3.90 \times Dv$$

The index S is an evaluation index to evaluate how the virtual image V is likely to fall. As the index S gets greater, the resulting virtual image V appears to fall as viewed from the viewer 1. The head-up display device 100 according to the present embodiment is configured so that the index S is 90 or greater.

The following explains how the above-mentioned expression 1 is derived.

First, as illustrated in FIG. 2, the head-up display devices Nos. 1 to 17 are prepared, whose respective parameter values (i.e., Mh, Mv, Wh, Wv, Wi, Ci, Dv) are different from one another. Each of the models Nos. 1 to 17 has a vertical field angle of 3 degrees.

The models Nos. 1 to 17 are new models, not existing models. The models Nos. 1 to 17 are particularly different from any existing models in that the angle Dv is 40 degrees or greater. None of the models Nos. 1 to 17 is provided with a condition related to tilting of the virtual image V, which is a display distance (i.e., distance from the viewpoint of the viewer 1 to the virtual image V) of 4 m to 8 m, a depth of 4 m, and a tilt angle θ of 85 degrees, as an optimal optical design condition, and the models Nos. 1 to 17 are designated so that the center of the virtual image V is formed 5.3 m ahead within the range of the image quality which is equal to the conventional ones.

Under this condition, measurement was conducted to see whether a desired tilt angle of 85.5 degrees and a desired display distance of 4 to 8 m are obtained.

The results of designing of the models Nos. 1 to 17 demonstrate that a depth of 2.54 to 4.60 m and a tilt angle θ of 83.47 to 85.94 degrees are obtained, compared to a desired display distance of 4 to 8 m (a depth of 4 m), as illustrated in FIG. 3.

Note that in FIG. 3, the virtual image distance (VID) indicates a display distance. VID1 indicates a distance from the viewpoint of the viewer 1 to the lower end Pb of the virtual image V. VID2 indicates a distance from the viewpoint of the viewer 1 to the center position Pc of the virtual image V. VID3 indicates a distance from the viewpoint of the viewer 1 to the upper end Pu of the virtual image V.

Next, the target index T of the model No. 13 whose tilt angle θ is closest to the desired tilt angle (85.5 degrees) is set to 100, among the models Nos. 1 to 17. In addition, the target indices T of the other models, other than the model No. 13, are determined using the following expression 2.

$$T = 100 \times \text{depth of virtual image of other} \qquad \text{(Expression 2)}$$
$$\text{models/depth of virtual image of the model No. 13}$$

The depth of the virtual image of the model No. 13 is 3.95 m.

Here, as the following expression 3 shows, the index S is obtained by multiplying each parameter value (Mh, Mv, Wh, Wv, Wi, Ci, Dv) by an unknown coefficient A to G.

$$S = A \times Mh + B \times Mv + \qquad \text{(Expression 3)}$$
$$C \times Wh + D \times Wv + E \times Wi + F \times Ci + G \times Dv$$

The coefficients A to G are desirably determined so that the evaluation indices S of the models Nos. 1 to 17 correspond to the target index T. With this in view, the coefficients A to G as illustrated in the upper part of FIG. 2 are calculated by setting the error Δ=S−T and calculating the coefficients A to G such that the sum of squares of Δ is at the minimum by using the solver function.

In other words, the coefficients A to G are calculated as follows.

A=10.652
B=−8.324
C=−0.0187
D=−0.000995
E=0.345
F=−3.521 G=3.902

The above expression 1 is obtained by substituting the values of the coefficients A to G, set to the three effective digits, into the above expression 3.

The index S is greater as Mh, Wi, and Dv, by which the coefficients A, E, and G, being positive values, are multiplied, are greater. The index S is smaller as Mv, Wh, Wv, and Ci, by which the coefficients B to D, and F, being negative values, are multiplied, are greater.

The following explains the reason why the index S being 90 or greater (S≥90) is set as a condition.

A typical overlook angle of a virtual image displayed on a head-up display device mounted in a vehicle is approximately 0 to 5 degrees. Therefore, so as to render a display of the virtual image V which is parallel to a road, the virtual image V is required to be tilted at 85 degrees or greater. Note that the overlook angle is an angle formed by a line segment passing through the viewer's viewpoint and the center position of the virtual image, with respect to the horizontal surface.

The following expression 4 represents the relationship between the tilt angle θ and the index S, as represented by an approximation straight line based on the result of 17 patterns for the models Nos. 1 to 17.

$$\theta = 0.0474 \times S + 80.70 \qquad \text{(Expression 4)}$$

When the above expression 4 is used to obtain the index S whose tilt angle θ is 85 degrees or greater, the index S is 90.7. By rounding off the first decimal place thereof, the index S is 90.

Therefore, it is found that, when the index S is 90 or greater, a tilted virtual image of 4 to 8 m can be obtained, which is substantially parallel to the road surface as viewed from the viewer 1, at the overlook angle of 0 to 5 degrees.

Figure 4:
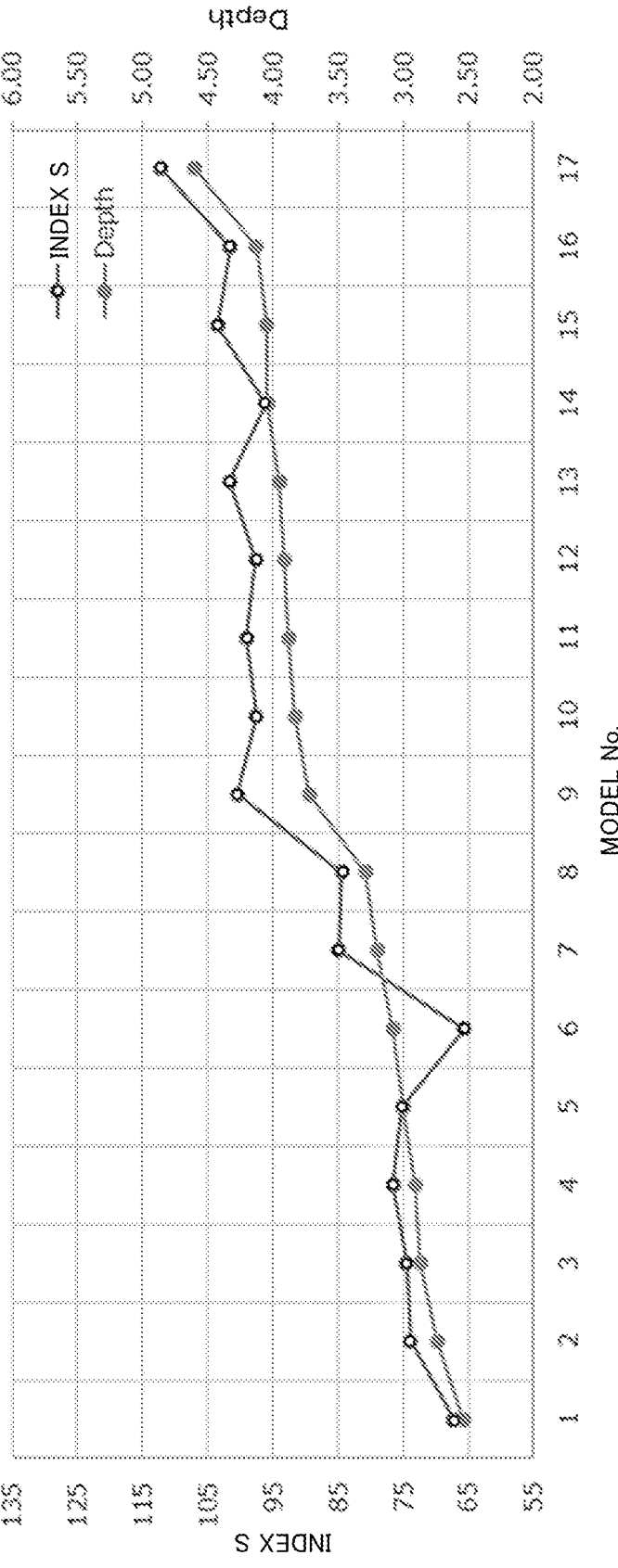
FIG. 4 is a graph illustrating a relationship between indices and depths of virtual image for each model.

FIG. 4 is a graph in which indices S and depths L are plotted and connected by line segments, for the models Nos. 1 to 17. This graph demonstrates that the index S correlates with the depth L, and thus is an appropriate evaluation index.

Each of the models Nos. 1 to 8 has an index S which is less than 90, and have a virtual image V which is hard to fall. Therefore, with the models Nos. 1 to 8, it is difficult to obtain a tilted virtual image which is substantially parallel to the road surface as viewed from the viewer 1. On the other hand, each of the models Nos. 9 to 17 has an index S which is 90 or greater, and can obtain a tilted virtual image which is substantially parallel to the road surface as viewed from the viewer 1. The range of each parameter for the models Nos. 9 to 17 is as follows.

Mh=14.1 to 16.7
Mv=12.1 to 16.0
Wh=2192 to 3798
Wv=4618 to 10138
Wi=60.3 to 64.9
Ci=21.5 to 26.5
Dv=40 to 46
S=96 to 112

The lower limit of the index S is set to 90. However, the upper limit of the index S is not set. The reason for this is that the tilt angle θ hardly gets excessively great for structural reasons. Even if the tilt angle θ is greater than a desired tilt angle, it is easy to reduce the tilt angle θ by reducing the angle Dv, for example. Therefore, there is little need to set the upper limit of the index S.

Not limited to this example, by rounding off the first decimal place of the index S=90.7, the index S is 91. Therefore, the condition of the index S being 91 or greater (S≥91) may be the condition to form the head-up display device 100.

The head-up display device 100 may be any one of the models Nos. 9 to 17, or may have parameter values other than those of the models Nos. 9 to 17 as long as the forming condition of the index S is 90 or 91 or greater.

Effect

The following effects are obtained by the above-described first embodiment.

(1) The head-up display device 100 displays a virtual image V by emitting the display light L toward the windshield 201. The head-up display device 100 includes a light emission surface 11 that displays an image G, and emits display light L which corresponds to the displayed image G, and a concave mirror 30 that reflects the display light L toward windshield 201, and has an index S, represented in the following expression 1, which is set to 90 or greater.

$$S = 10.7 \times Mh + (-8.32) \times Mv + (-0.0187) \times Wh + \qquad \text{(Expression 1)}$$

$$(-0.000995) \times Wv + 0.345 \times Wi + (-3.52) \times Ci + 3.90 \times Dv$$

Mh: Magnification in the horizontal direction (the left-right direction with reference to the viewer 1) of the virtual image V with respect to the image G in the optical axis position of the display light L [−]

Mv: Magnification in the vertical direction (the up-down direction with reference to the viewer 1) of the virtual image V with respect to the image G in the optical axis position of the display light L [−]

Wh: Curvature radius in the horizontal direction of the position in which the optical axis of the display light L reaches in the windshield 201 [mm]

Wv: Curvature radius in the vertical direction of the position in which the optical axis of the display light L reaches in the windshield 201 [mm]

Wi: Incident angle of the optical axis of the display light L into the windshield 201 [deg]

Ci: Incident angle of the optical axis of the display light L into the concave mirror 30 [deg]

Dv: Angle formed between the normal line of the light emission surface 11 as viewed from the horizontal direction and the optical axis of the display light L emitted from the light emission surface 11 [deg] According to this configuration, falling of the virtual image V as viewed from the viewer 1 is restrained, and the virtual image V can be displayed with a desired tilt angle.

(2) A vehicle 200, which is an exemplary vehicle on which the head-up display device 100 is mounted, is such that the head-up display device 100 displays the virtual image V at an angle parallel to a road surface on which the vehicle 200 travels.

According to this configuration, the virtual image V can be displayed at the angle parallel to the road surface.

Note that the present disclosure is not limited to the above-described embodiment and the drawings, and any necessary modification (including deletion of any constituting element) can be made within the scope not changing the essence of the present disclosure.

The following explains an exemplary modification.

Modification

In the above-described embodiment, the head-up display device 100 may include a single plane mirror or a plurality of plane mirrors, and the mirror or mirrors may be provided to turn back the optical path of the display light L from the light emission surface 11 to the windshield 201. For example, the single plane mirror may be configured to reflect the display light L from the light emission surface 11 toward the reflection surface 31 of the concave mirror 30.

The head-up display device 100 is mounted in the vehicle 200 in the above-described embodiment. However, the head-up display device 100 may be mounted in a vehicle which is not the vehicle 200.

REFERENCE SIGNS LIST

1 Viewer
10 Display unit
11 Light emission surface
12 Display
13 Illuminating device
30 Concave mirror
31 Reflection surface
60 Housing
61 Opening
62 Window
100 Head-up display device
200 Vehicle
201 Windshield
θ Tilt angle
G Image
L Display light
S Index
T Target index
V Virtual image
IL Illumination light
Pb, Qb Lower end
Pu, Qu Upper end
Pc Center position
Mh, Mv Magnification
Wi, Ci Incident angle
Dv Angle
Ls Reference line
Wh, Wv Curvature radius

The invention claimed is:
1. A head-up display device displaying a virtual image by emitting display light toward a windshield, the head-up display device comprising:
   a light emission surface that displays an image and emits display light which corresponds to the displayed image; and
   a concave mirror that reflects the display light toward the windshield, wherein
   an index S represented in expression 1 is set to 90 or greater, where

9
10 the expression 1 is $S=10.7\times Mh+(-8.32)\times Mv+(-0.0187)\times Wh+(-0.000995)\times Wv+0.345\times Wi+(-3.52)\times Ci+3.90\times Dv$, in which Mh: Magnification in a horizontal direction of the virtual image with respect to the image in an optical axis position of the display light [−];

Mv: Magnification in a vertical direction of the virtual image with respect to the image in the optical axis position of the display light [−];

Wh: Curvature radius in the horizontal direction of a position in which an optical axis of the display light reaches in the windshield [mm];

Wv: Curvature radius in the vertical direction of the position in which the optical axis of the display light reaches in the windshield [mm];

Wi: Incident angle of the optical axis of the display light into the windshield [deg];

Ci: Incident angle of the optical axis of the display light into the concave mirror [deg]; and Dv: Angle formed between a normal line of the light emission surface as viewed from the horizontal direction and the optical axis of the display light emitted from the light emission surface [deg].

2. The head-up display device according to claim 1, comprising:

a single plane mirror or a plurality of plane mirrors provided to turn back an optical path of the display light from the light emission surface to the windshield.

3. A vehicle on which the head-up display device according to claim 1 is mounted, wherein the head-up display device displays the virtual image at an angle parallel to a road surface on which the vehicle travels.

4. The head-up display device according to claim 1, wherein the index S represented in Expression 1 is 91 or greater, and the angle Dv is 40 degrees or greater.

* * * * *